(12) United States Patent
Lattanzi et al.

(10) Patent No.: US 6,246,671 B1
(45) Date of Patent: Jun. 12, 2001

(54) ISDN TERMINAL ADAPTER-RESIDENT MECHANISM FOR AUTOMATICALLY DETERMINING TELECOMMUNICATION SWITCH TYPE AND GENERATING ASSOCIATED SERVICE PROFILE IDENTIFIERS

(75) Inventors: Michael T. Lattanzi; James M. Glass, III; Paul G. McElroy, all of Huntsville; Charles R. Rehage, Ardmore, all of AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 09/042,838

(22) Filed: Mar. 17, 1998

(51) Int. Cl.[7] .............................. H04L 12/28; H04L 12/66
(52) U.S. Cl. ..................... 370/254; 370/463; 370/465; 370/524; 709/228; 710/68
(58) Field of Search .................................. 370/252, 254, 370/255, 401, 463, 465, 466, 476, 522, 524; 709/202, 228; 710/68

(56) References Cited

U.S. PATENT DOCUMENTS

| | | | |
|---|---|---|---|
| 5,329,318 | 7/1994 | Keith | 348/699 |
| 5,621,731 | 4/1997 | Dale et al. | 370/79 |
| 5,708,778 | 1/1998 | Monot | 395/200.1 |
| 5,715,241 | 2/1998 | Glass, III et al. | 370/252 |
| 5,748,628 | 5/1998 | Ericson et al. | 370/384 |
| 5,793,307 | 8/1998 | Perreault et al. | 340/825.5 |
| 5,864,559 | 1/1999 | Jou et al. | 370/465 |
| 5,867,789 | 2/1999 | Olds et al. | 455/453 |
| 5,883,883 | 3/1999 | Baker et al. | 370/250 |
| 5,916,304 | 6/1999 | Ericson et al. | 709/222 |
| 5,931,928 | * 8/1999 | Brennan et al. | 370/401 |

FOREIGN PATENT DOCUMENTS

| | | |
|---|---|---|
| WO 95/22218 | 8/1995 | (WO) . |
| WO 96/22218 | 8/1995 | (WO) . |

* cited by examiner

Primary Examiner—Wellington Chin
Assistant Examiner—Malkhanh Tran
(74) Attorney, Agent, or Firm—Allen, Dyer, Doppelt, Milbrath & Gilchrist, P.A.

(57) ABSTRACT

An automated telecommunication switch type and protocol detection routine transmits an interrogation message to a telecommunication switch. The contents of the interrogation message are such as to cause the switch to transmit a response message that uniquely identifies only one switch protocol and switch type. Once switch type and protocol have been automatically determined, this information may be coupled with an automated service profile identifier (SPID) detection mechanism to facilitate generation of the requisite SPID(s).

34 Claims, 12 Drawing Sheets

SPID FORMAT TABLE - AT&T 5ESS SWITCH

| PREFIX | SUFFIX | SPID FORMAT |
|---|---|---|
| NONE | NONE | NO SPIDs |
| 01 | 0 | 01 + 7 DIGITS + 0 |
| END OF TABLE | | |

*NONE* INDICATES NO PREFIX OR SUFFIX

FIG. 6

SPID FORMAT TABLE - NATIONAL ISDN/DMS-100 CUSTOM SWITCH

| PREFIX | SUFFIX | SPID FORMAT |
|---|---|---|
| NATIONAL ISDN | | |
| AC | 0101 | AREA CODE + 7 DIGITS + 0101 |
| AC | 0100 | AREA CODE + 7 DIGITS + 0100 |
| AC | 000 | AREA CODE + 7 DIGITS + 000 |
| AC | 0 | AREA CODE + 7 DIGITS + 0 |
| AC | 00 | AREA CODE + 7 DIGITS + 00 |
| AC | 100 | AREA CODE + 7 DIGITS + 100 |
| AC | 0000 | AREA CODE + 7 DIGITS + 0000 |
| AC | 0011 | AREA CODE + 7 DIGITS + 0011 |
| AC | 0111 | AREA CODE + 7 DIGITS + 0111 |
| 01 | 0 | 01 + 7 DIGITS + 0 |
| 01 | 000 | 01 + 7 DIGITS + 000 |
| 01 | 001 | 01+ 7 DIGITS + 001 |
| 01 | 011 | 01 + 7 DIGITS + 011 |
| DMS-100 CUSTOM | | |
| NONE | NONE | 7 DIGITS |
| AC | NONE | AREA CODE + 7 DIGITS |
| AC | LDN[6]LDN[7] | AREA CODE + 7 DIGITS + LDN[6]LDN[7] |
| AC | LDN[7] | AREA CODE + 7 DIGITS + LDN[7] |
| AC | 01 | AREA CODE + 7 DIGITS + 01 |
| AC | 11 | AREA CODE + 7 DIGITS + 11 |
| AC | 0001 | AREA CODE + 7 DIGITS + 0001 |
| AC | 0111 | AREA CODE + 7 DIGITS + 0111 |
|    | 0211 | AREA CODE + 7 DIGITS + 0211 |
| AC | 1 | AREA CODE + 7 DIGITS + 1 |
|    | 2 | AREA CODE + 7 DIGITS + 2 |
| NONE | 00 | 7 DIGITS + 00 |
| END OF TABLE | | |

*NONE* INDICATES NO PREFIX OR SUFFIX
AC REPRESENTS THE 3 DIGIT AREA CODE
LDN[n] IS THE nth DIGIT OF THE LOCAL DIRECTORY NUMBER

FIG. 7

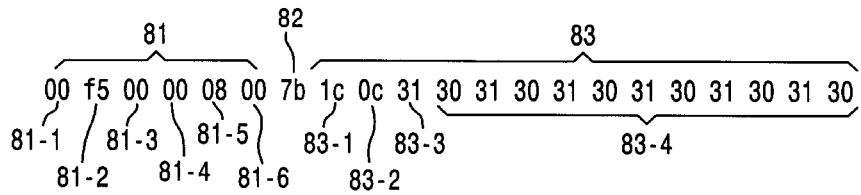

FIG. 8

| SWITCH PROTOCOL | SWITCH RESPONSE | | | | |
|---|---|---|---|---|---|
| | MESSAGE | | | INFORMATION ELEMENT | |
| | MESSAGE (HEX) | VALUE | DESCRIPTION | VALUE | DESCRIPTION |
| NORTEL DMS-100 (CUSTOM) | 02 f5 00 02 08 00 7b 08 02 82 b2 | 7b | INFORMATION | 08 | CAUSE CODE: REQUESTED FACILITY NOT SUBSCRIBED |
| AT&T 5ESS MP[1] (CUSTOM) | 02 ff 03 08 01 00 00 f7 96 7a 04 03 80 81 81 | f7 | MANAGEMENT INFORMATION | 96 72 | LOCKING SHIFT TO CODESET 6 MANAGEMENT |
| AT&T 5ESS PP[2] (CUSTOM) | 02 b1 00 00 08 00 7b 96 32 01 01 3b 01 10 | 7b | INFORMATION | 96 32 3b | LOCKING SHIFT TO CODESET 6 KEYPAD CONTROL DISPLAY CONTROL |
| NATIONAL ISDN[3] (AT&T 5ESS) | 02 81 00 02 08 00 7b 32 01 c3 | 7b | INFORMATION | 32 | INFORMATION: PROMPT FOR ADDITIONAL TERMINAL IDENTIFICATION INFORMATION |
| NATIONAL ISDN[3] (NORTEL DMS-100) | 02 e5 00 02 08 00 7b 08 02 82 b2 32 01 c3 | 7b | INFORMATION | 08 32 | CAUSE CODE: REQUESTED FACILITY NOT SUBSCRIBED INFORMATION: PROMPT FOR ADDITIONAL TERMINAL IDENTIFICATION INFORMATION |
| NATIONAL ISDN[3] (SIEMENS EWSD) | 02 d3 00 02 08 00 7d 08 03 82 c3 04 14 01 00 | 7d | STATUS | 08 14 | CAUSE CODE: INFORMATION ELEMENT NONEXISTENT OR NOT IMPLEMENTED CALL STATE: NULL |

[1]AT&T MULTIPOINT ISDN LINE CONFIGURATION. [2]AT&T POINT-TO-POINT ISDN LINE CONFIGURATION.
[3]NATIONAL ISDN SOFTWARE RUNNING ON THE LISTED VENDORS SWITCH.

FIG. 9

Nortel DMS-100

U-Chip is reset
U-Chip (NT) issued wakeup
U-Chip Activation Status 1
U-chip (NT) in sync
U-chip (NT) received act bit
TX[0]: fc ff 03 0f 00 56 01 ff
U-chip (NT) received act bit
TX[0]: fc ff 03 0f 05 b7 01 ff
RX[0]: fe ff 03 0f 05 b7 02 f5
RX[0]: fe ff 03 0f 00 00 04 ff
TX[0]: 00 f5 7f
TX[0]: fc ff 03 0f 61 28 05 f5
RX[0]: 00 f5 73
TX[0]: 00 f5 00 00 08 00 7b (Information)
    62 0c 31 30 31 30 31 30 31 30 31 30
       31 30
RX[0]: 00 f5 01 02
RX[0]: 02 f5 00 02 08 00 7b (Information)
    08 02 82 b2
TX[0]: 02 f5 01 02

FIG. 10

AT&T 5ESS Custom (MulitPoint)

U-Chip is reset
U-Chip Activation Status 1
U-chip (NT) in sync
U-chip (NT) received act bit
TX[0]: fc ff 03 0f 00 56 01 ff
TX[0]: fc ff 03 0f 05 b7 01 ff
RX[0]: 02 ff 03 08 01 00 00 f7
    96
    7a 04 03 80 81 81
TX[0]: fc ff 03 0f 61 28 01 ff
RX[0]: fe ff 03 0f 61 28 02 c1
TX[0]: 00 e1 7f
RX[0]: 00 e1 73
TX[0]: 00 e1 00 00 08 00 7b (Information)
    62 0c 31 30 31 30 31 30 31 30 31 30
       31 30
RX[0]: 00 e1 01 02
RX[0]: 02 ff 03 08 01 00 f7
    96
    7a 04 03 80 81 81

FIG. 11

AT&T 5ESS Custom (Point to Point)

U-Chip is reset
U-Chip (NT) issued wakeup
U-Chip Activation Status 1
U-chip (NT) in sync
U-chip (NT) received act bit
TX[0]: fc ff 03 0f 00 56 01 ff
TX[0]: fc ff 03 0f 05 b7 01 ff
RX[0]: 02 ff 03 08 01 00 ff 05 (Setup)
    04 03 80 90 a2
    18 01 88
    96
    25 01 01
TX[0]: fc ff 03 0f 61 28 01 ff
RX[0]: fe ff 03 0f 61 28 02 b1
TX[0]: 00 b1 7f
RX[0]: 00 b1 73
TX[0]: 00 b1 00 00 08 00 7b (Information)
    62 0c 31 30 31 30 31 30 31 30 31 30
       31 30
RX[0]: 02 b1 00 00 08 00 7b (Information)
    96
    39 02 c7 01

FIG. 12

NATIONAL ISDN (AT&T 5ESS)

U-Chip is reset
U-Chip Activation Status 1
U-chip (NT) in sync
U-chip (NT) received act bit
TX[0]: fc ff 03 0f 00 56 01 ff
TX[0]: fc ff 03 0f 05 b7 01 ff
TX[0]: fc ff 03 0f 61 28 01 ff
RX[0]: fe ff 03 0f 61 28 02 81
TX[0]: 00 81 7f
RX[0]: 00 81 73
TX[0]: 00 81 00 00 08 00 7b (Information)
    62 0c 31 30 31 30 31 30 31 30 31 30
       31 30
RX[0]: 02 81 01 02
RX[0]: 02 81 00 02 08 00 7b (Information)
    32 01 c3

FIG. 13

NATIONAL ISDN (Nortel DMS-100)

U-Chip is reset
U-Chip (NT) issued wakeup
U-Chip Activation Status 1
U-chip (NT) in sync
U-chip (NT) received act bit
RX[0]: 42 2b 7f
TX[0]: fc ff 03 0f 00 56 01 ff
RX[0]: fe ff 03 0f 00 56 02 e5
RX[0]: fe ff 03 0f 00 00 04 ff
TX[0]: 00 e5 7f
TX[0]: fc ff 03 0f 05 b7 05 e5
RX[0]: 00 e5 73
<u>TX[0]: 00 e5 00 00 08 00 7b (Information)</u>
<u>    62 0c 31 30 31 30 31 30 31 30 31 30</u>
<u>       31 30</u>
RX[0]: 00 e5 01 02
<u>RX[0]: 02 e5 00 02 08 00 7b (Information)</u>
<u>    08 02 82 b2</u>
<u>    32 01 c3</u>

FIG. 14

National ISDN (Siemens EWSD)

U-Chip is reset
U-Chip Activation Status 1
U-chip (NT) in sync
U-chip (NT) received act bit
TX[0]: fc ff 03 0f 00 56 01 ff
RX[0]: fe ff 03 0f 00 56 02 d3
TX[0]: 00 d3 7f
RX[0]: 00 d3 1f1!
TX[0]: 00 d3 7f
RX[0]: 00 d3 1f1!
TX[0]: 00 d3 7f
RX[0]: 00 d3 73
<u>TX[0]: 00 d3 00 00 08 00 7b (Information)</u>
<u>    1c 0c 31 31 31 31 31 31 31 31 31 31</u>
<u>       31 31</u>
RX[0]: 00 d3 01 02
<u>RX[0]: 02 d3 00 02 08 00 7d (Status)</u>
<u>    08 03 82 e3 04</u>
<u>    14 01 00</u>

FIG. 15

ISDN TERMINAL ADAPTER-RESIDENT MECHANISM FOR AUTOMATICALLY DETERMINING TELECOMMUNICATION SWITCH TYPE AND GENERATING ASSOCIATED SERVICE PROFILE IDENTIFIERS

CROSS-REFERENCE TO RELATED APPLICATIONS

The present application relates to subject matter described in co-pending U.S. patent application Ser. No. 08/889,533 (hereinafter referred to as the 1533 application), filed Jul. 8, 1997 by James M. Glass, entitled "ISDN Terminal Equipment-Resident Mechanism for Automatically Determining Service Profile Identifiers (SPIDs) for Subdivided Area Code," which is a continuation-in-part of U.S. patent application Ser. No. 08/648,519 by James M. Glass et al, entitled: "ISDN Terminal Equipment-Resident Mechanism for Determining Service Profile Identifiers and Associated Telecommunication Switch Protocol," filed May 13, 1996, and issued Feb. 3, 1998 as U.S. Pat. No. 5,715,241 (hereinafter referred to as the '241 patent), each application being assigned to the assignee of the present application and the disclosures of which are herein incorporated.

FIELD OF THE INVENTION

The present invention is directed to a link pre-establishment control mechanism employed by the microcontroller of integrated services digital network (ISDN) terminal equipment. In particular, the invention is directed to an automated telecommunication switch type and protocol detection (or AUTOSWITCH) routine, which interrogates the telecommunication switch of a local service provider with a message, that causes the switch to transmit a response message, from which both the type and communication protocol of the switch can be readily determined. Once determined, this switch type and protocol information may be used by the automated service profile identifiers (SPID) detection mechanism described in the above-referenced '241 patent to facilitate SPID generation.

BACKGROUND OF THE INVENTION

As described in the above-referenced '241 patent, integrated services digital network (ISDN) communications make it possible for telephone service providers to supply multiple types of signalling channels from a central office over a single twisted pair-configured, local loop to a network termination interface or ISDN terminal equipment. Such ISDN equipment may comprise, but is not limited to, an ISDN phone, an X.25 packet device, or an ISDN terminal adapter, to which customer premises-resident data terminal equipment may be coupled. These multiple types of signalling channels typically include a digital data channel, a digitized voice channel and a separate dialing channel.

In order for a customer to place a call through an installed piece of terminal equipment, it is necessary that the terminal equipment's supervisory communication controller be properly preconfigured with a prescribed set of communication parameters. These parameters include the telecommunication switch protocol employed in the local service provider's central office facility, the local directory numbers (LDNs), including area codes, associated with the two ISDN bearer (B1, B2) channels, and a service profile identifier or SPID. (The SPID is a sequence of digits, which identifies the ISDN terminal equipment that is coupled to the ISDN switch, and is assigned by the local telephone service provider, when the ISDN line is installed.)

Now even though the switch protocol and SPID parameters are routinely supplied by the telephone service provider to the purchaser of the ISDN terminal equipment, the end user is unfamiliar with ISDN terminology, and is accustomed to simply installing an analog modem in the customer's premises-located equipment, and plugging a telephone connector into a modem port (such as an RJ 11 jack). Indeed, experience has shown that on the order of eighty percent of ISDN customers will burden the equipment supplier and/or the local telephone service provider with requests for technical support, in the course of configuring the settings for ISDN terminal equipment, even if the service provider has correctly supplied the customer with each of the switch protocol, SPID and LDN parameters for use by the customer's ISDN terminal equipment.

Advantageously, the invention described in the '241 patent successfully remedies this problem by means of an automated SPID/switch detector mechanism (or AUTOSPID detector), that is incorporated into the terminal equipment's communication control software. The only customer participation required is that of inputting the local directory numbers (including area code), and invoking the AUTOSPID mechanism via a user interface. Once invoked, the AUTOSPID mechanism proceeds to automatically step through a prescribed SPID table search and generation sequence, followed by placing a test call communication exchange with the telecommunication switch employed by the local service provider to couple the customer's equipment with the network.

Now although the AUTOSPID detection scheme described in the '241 patent is a very effective mechanism for remedying the above-referenced terminal equipment configuration problem, it would be desirable to enhance (e.g., improve the reliability of) that AUTOSPID detection scheme, on the one hand, and to provide, in addition, a mechanism that is able to determine, independently of SPID generation, both the type and communication protocol of the telecommunication switch to which the customer's ISDN terminal adapter is coupled.

SUMMARY OF THE INVENTION

In accordance with the present invention, this objective is attained by means of an automated telecommunication switch type and protocol detection routine, termed AUTOSWITCH, which is operative to interrogate the telecommunication switch with a prescribed switch-interrogation message. The content of this interrogation message has been composed, so that it is insufficient to be recognized by the switch as a fully valid message, yet is sufficient to evoke a reply from the switch, which uniquely identifies both the type and the protocol being used by the switch, regardless of switch type. Once switch type and protocol have been automatically determined, this information may be coupled with the automated service profile identifiers (SPID) detection mechanism described in the above-referenced '241 patent to facilitate generation of the requisite SPID(s).

The switch-interrogation message employed in the present invention includes a standard header portion which conforms with conventional switch communication protocol. Following the header is a byte having the value 7b (hex), an information message type, which includes a first byte having the value 1c, a facility information element, followed by a byte representative of the length of the facility information element. This is followed by a service discriminator byte, which, in turn, is followed by the components of the facility information element, comprised of a payload sequence of arbitrary bytes. In order to prevent the switch from understanding the interrogation message, an invalid value is inserted in the location of the service discriminator; also, the payload component of the facility information element an invalid sequence (an alternately repeating series).

Once the terminal adapter has assembled the switch-interrogation message it transmits the message to the switch and waits for a reply message. The contents of the switch response message can be expected to correspond to one of those listed in a table associated with currently employed switches, so that a comparison of the contents of the response message from the switch with the various tabulated response messages will allow the switch protocol to be identified. Once a reply message from the interrogated switch is received, the process proceeds to sequence through respective query steps, associated with the respectively different switches and protocols of the table, to identify the switch protocol and switch type.

If any of the query steps successfully identifies the switch type and protocol, the process conveys that information to the AUTOSPID routine described in the '241 patent, which is then run to completion, using the identified switch protocol information to facilitate the automatic SPID generation. If the switch type and protocol are not identified, however, then it is inferred that the switch protocol is none of those listed in the table, and the routine branches to the AUTOSPID routine of the '241 patent, but without switch protocol information.

BRIEF DESCRIPTION OF THE DRAWINGS

FIG. 6 is a table of SPID formats associated with an AT&T Custom switch protocol;

FIG. 7 is a table of SPID formats associated with National ISDN and DMS-100 Custom switch protocols;

FIG. 8 shows the content of an interrogation/test message in accordance with the present invention, that is effective to evoke a response message, which uniquely identifies the type and protocol used by the switch being interrogated, regardless of switch type;

FIG. 9 is a table listing responses of respectively different telecommunication switches to the interrogation/test message employed in the switch interrogation mechanism of FIG. 16;

FIGS. 10–15 list channel trace contents of message exchanges between a terminal adapter and respective ones of the telecommunication switches listed in the table of FIG. 9;

DETAILED DESCRIPTION

Figure 1:
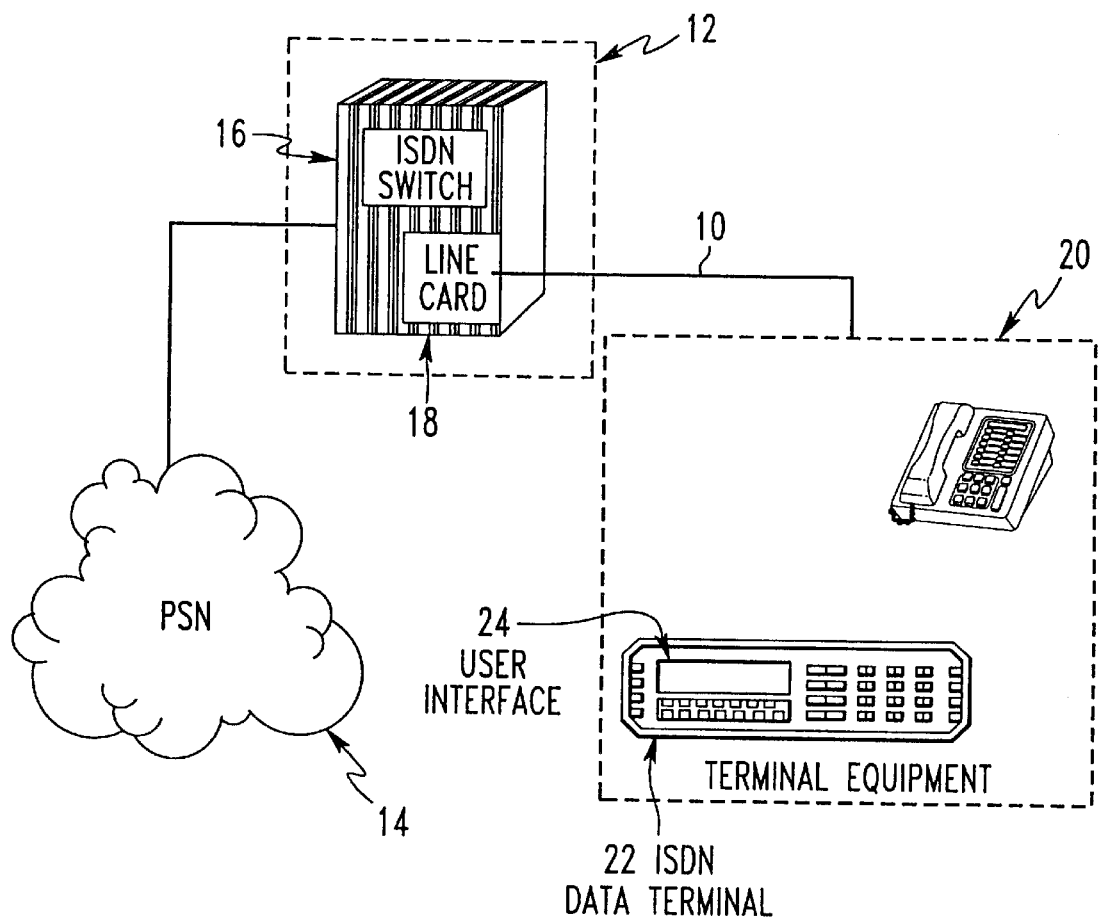
FIG. 1 diagrammatically illustrates a reduced complexity example of a typical integrated services digital network, having a local loop directly coupled from a telco central office, through which access to a public service network is provided.

Before describing in detail the automated telecommunication switch type and protocol detection mechanism in accordance with the present invention, it should be observed that the invention resides primarily in what is effectively a prescribed precursor ISDN communication link pre-establishment control mechanism, that is embedded in the communication control software resident in ISDN terminal equipment. The particular data format and communication protocol employed by the switch to which the ISDN terminal equipment is linked is not considered part of the invention.

As a result, the invention has been illustrated in the drawings in readily understandable block diagram and associated flow chart format, which show only those specific details that are pertinent to the present invention, so as not to obscure the disclosure with details which will be readily apparent to those skilled in the art having the benefit of the description herein. Thus, the block diagram and flow chart illustrations are primarily intended to illustrate the major components of the communication control mechanism in a convenient functional grouping, whereby the present invention may be more readily understood.

FIG. 1 diagrammatically illustrates a reduced complexity example of a typical integrated services digital network (ISDN), having a local loop (twisted tip/ring pair) 10 directly coupled from a central office 12 of a telephone service provider, through which access to a public switched telephone network (PSTN) 14 is provided. The central office 12 includes a central office switch 16, which contains a plurality of line termination circuits (or line cards), one of which is shown at 18. As non-limiting examples, the central office switch 12 may comprise any one of an AT&T 5ESS custom switch, a Northern Telecom DMS-100 custom switch, a Siemens EWSD switch (employing National ISDN protocol), or National ISDN firmware-customized versions of the 5ESS and DMS-100 switches. Each of these respectively different switch protocols has its own characteristic SPID formats, which are not necessarily the same as those of any of the other switch protocols.

In the network of FIG. 1, a respective line card 18 of the central office switch 16 is coupled over the local loop 10 to ISDN terminal equipment 20, through an internal or external network termination circuit, to which customer premises equipment is coupled, as shown at 22. ISDN terminal equipment 20 may comprise an ISU 128 terminal adapter, manufactured by Adtran Corp., Huntsville, Ala., as a non-limiting example. It should be observed, however, that the present invention is not limited to use with this or any other particular piece of ISDN terminal equipment, but is intended as an augmentation to the communication supervisory control mechanisms employed in ISDN terminal equipments supplied from a variety of manufacturers.

To allow the customer to configure the ISDN terminal equipment 20 for use with a particular switch protocol, the terminal equipment 20 includes a user interface 24—for example, a set of front panel-mounted switches and an associated display, or a software-controlled computer interface, such as a terminal display screen menu, or AT commands, selections among which are invoked or supplied in a customary manner by the point and click operation of a mouse or keyboard-sourced inputs.

Of the configuration parameters required for successful terminal equipment operation, the telecommunication switch protocol employed by the central office 12, LDNS, and requisite service profile identifiers (SPIDs) for that switch protocol are usually supplied by the telephone service provider. However, as described previously, the customer may have difficulty in setting up these configuration parameters and can be expected to call the ISDN equipment supplier and/or the local telephone service provider, with a request for assistance as to how to configure the settings of the terminal equipment.

As detailed in the '241 patent, this problem is solved by augmenting the control software employed by the terminal equipment's supervisory communication controller with an AUTOSPID detection mechanism, which is operative to automatically step through a prescribed SPID table search and generation routine, followed by a test call communication exchange with the telecommunication switch employed by the local service provider to couple the customer's equipment with the network. During this process, the AUTOSPID detection mechanism iteratively attempts to register respectively different SPIDS, as necessary, until the correct SPID (and corresponding switch protocol) is identified.

Figure 3:
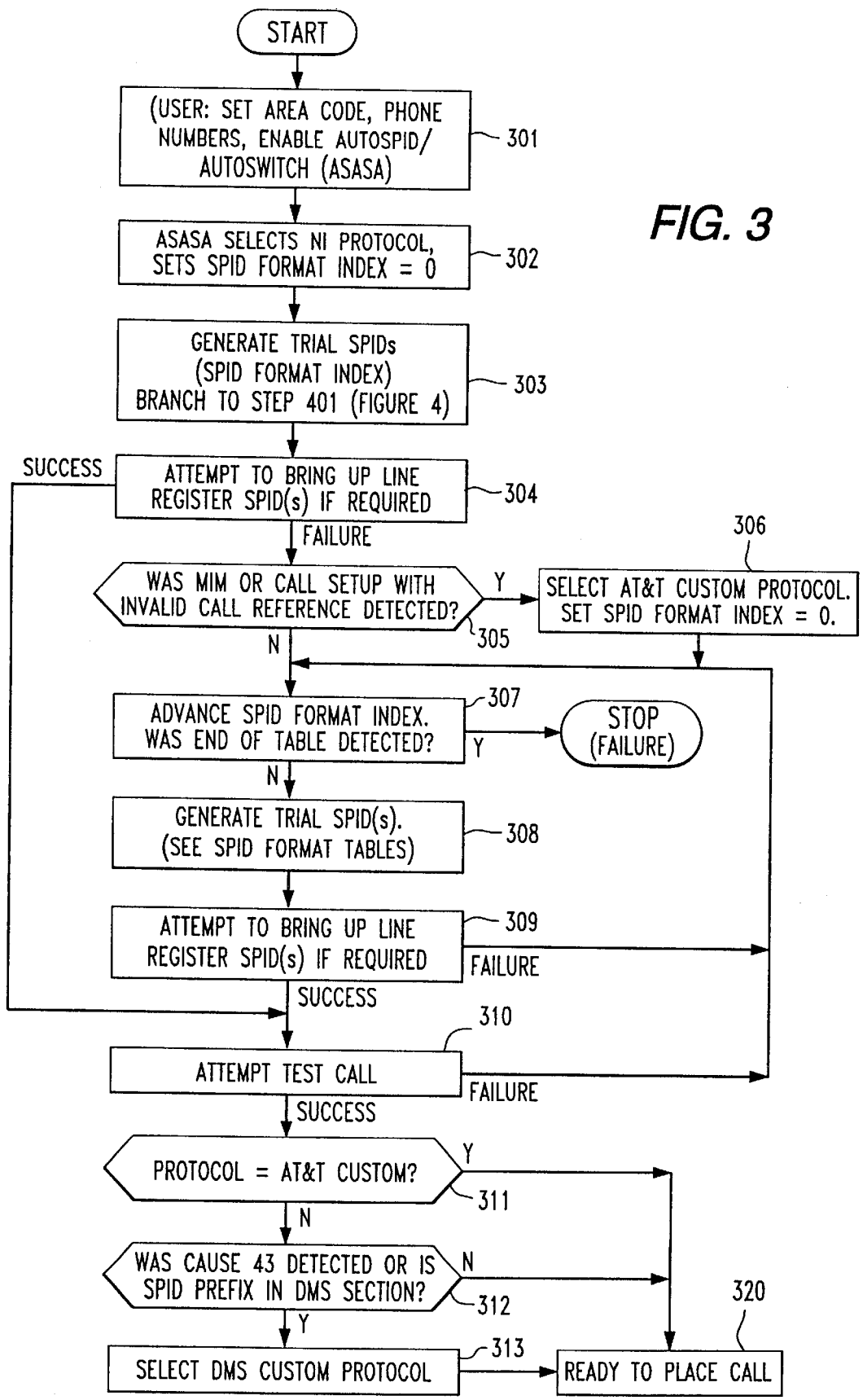
FIG. 3 shows respective steps of the link pre-establishment control mechanism executed by the AUTOSPID detection mechanism of the above-referenced '241 patent.
Figure 4:
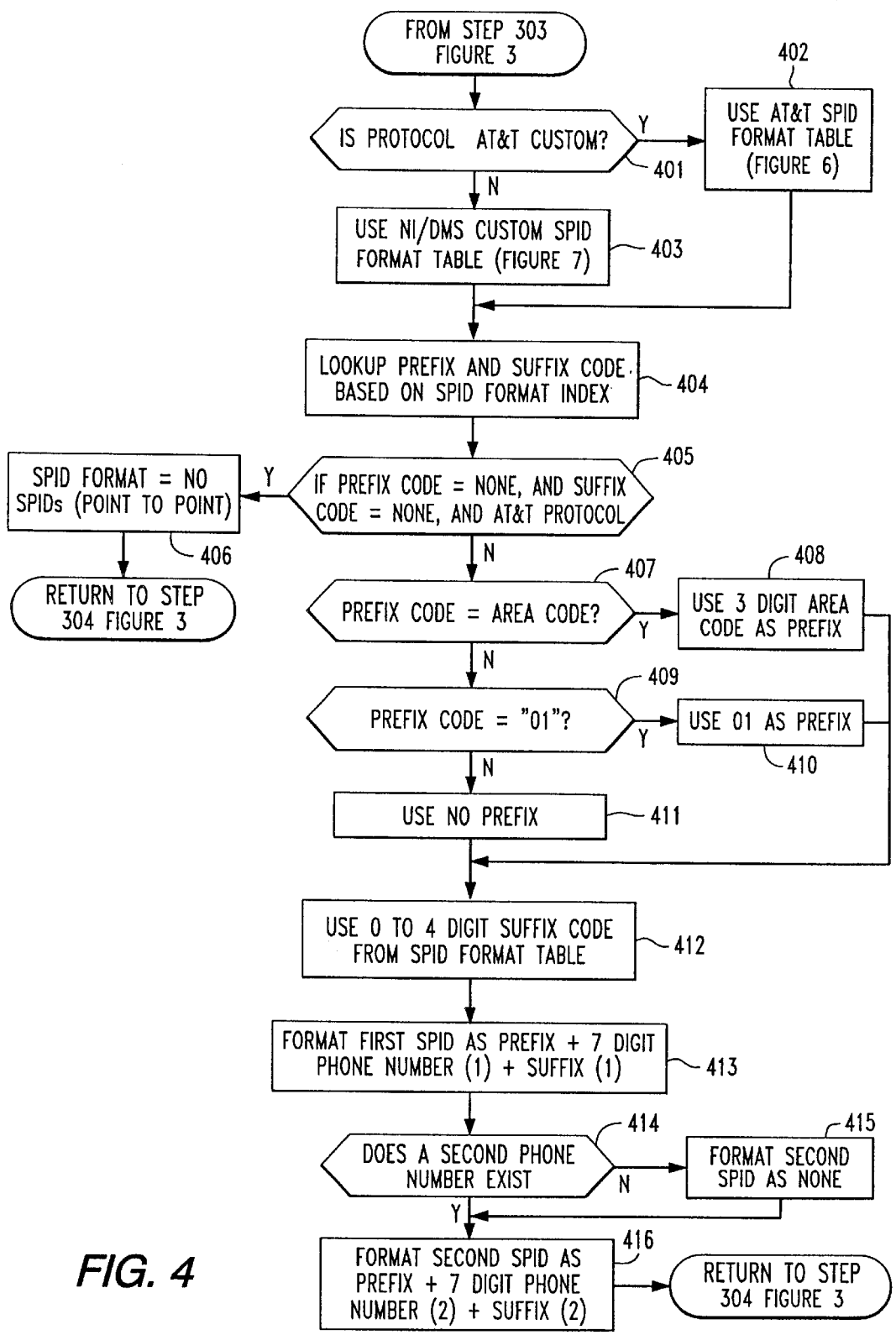
FIG. 4 shows the respective steps of a SPID format subroutine employed within the AUTOSPID detection mechanism of FIG. 3.
Figure 5:
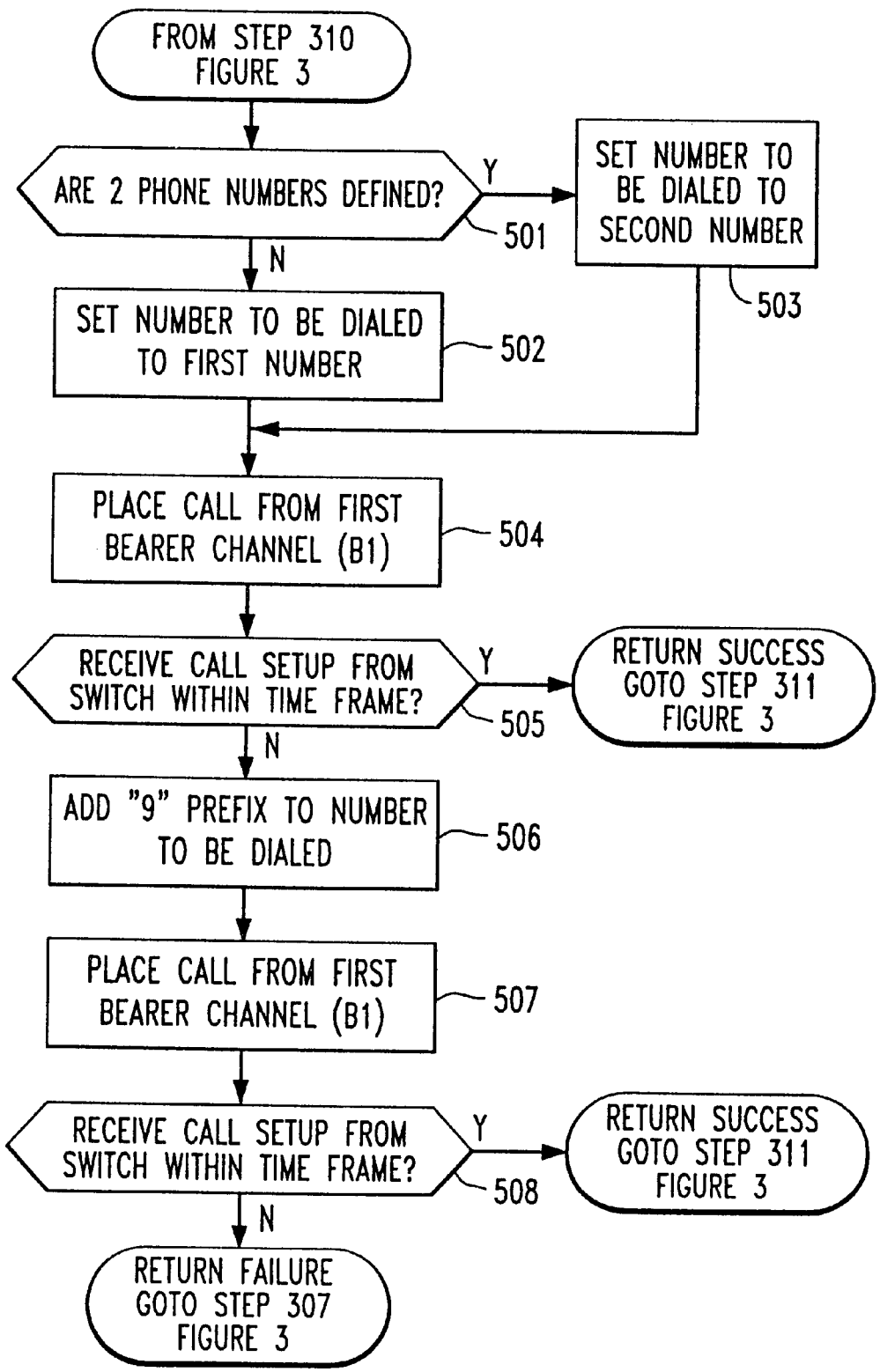
FIG. 5 shows the respective steps of a test call subroutine employed within the AUTOSPID detection mechanism of FIG. 3.

The respective steps of the SPID/switch protocol detection mechanism detailed in the '241 patent are illustrated in the flow charts of FIGS. 3–5. To facilitate correlation of the respective steps of the SPID detection process with the respective Figures, the prefix number for each step is the same as the number of the Figure whose flow chart contains that step. (It should also be noted that in the routine detailed in the flow charts of FIGS. 3–5, no determination is made as to whether the area code is a split area code. To accommodate the possibility of a split area code, the AUTOSPID detection routine described in the above-referenced '533 application may be employed.

Figure 2:
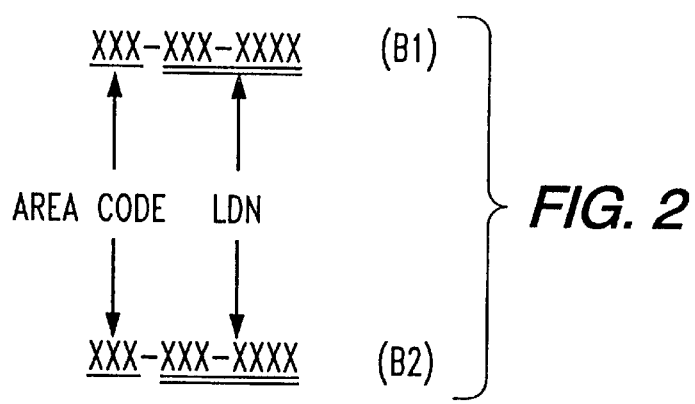
FIG. 2 shows the format of local directory numbers.

Referring initially to the flow chart of the link pre-establishment routine of FIG. 3, the process starts at step 301, wherein a user prompt message is generated, instructing the user to enter one or two local directory numbers (LDNs) including area codes, having the format shown in FIG. 2, followed by a menu selection or entry of an AT command via the terminal equipment user interface 24 of FIG. 1. As noted earlier, entry of such local directory number information may be accomplished by way of a set of front panel switches, or other user interface, and is the only information that is supplied by the user. Once the local directory number information (one or two LDNs) has been input by the user, and the user has initiated the iterative SPID/switch protocol search and detect routine to be described, the sequence transitions to step 302, which begins an iterative SPID search process.

More particularly, the SPID/switch protocol detection mechanism described in the above-referenced '241 patent is an exclusionary process, which attempts to bring up the line or register a SPID in an iterative or stepwise manner, proceeding through respective SPID format loops associated with separate tables or list entries for respectively different switch protocols that may be employed by the local service provider. For the switch protocols currently employed by telephone service providers, two respectively different SPID tables, the contents of which are listed in FIGS. 6 and 7, are accessed.

At the beginning of the process in step 302, the routine selects National ISDN protocol, as a non-limiting example, resets the SPID format index (sets the SPID format index to zero), which causes a loss of 2B1Q synchronization, resetting the link. With the SPID index currently reset (0) and the link reset, the routine transitions to step 303, which branches to the SPID format subroutine of FIG. 4.

As shown in FIG. 4, the SPID format routine begins with a query step 401 to determine whether the protocol is AT&T Custom (which has a reduced number of table entries as shown in FIG. 6). If the answer to query step 401 is YES (the SPID protocol is AT&T Custom), the subroutine transitions to step 402, wherein the AT&T format table shown in FIG. 6 is accessed. On the other hand, if the answer to query step 401 is NO (the SPID protocol is not AT&T Custom), the subroutine transitions to step 403, wherein the sequential listings for National ISDN and DMS-100 formats of the table shown in FIG. 7 are accessed.

Once a SPID format table has been selected, the subroutine transitions to step 404, wherein the SPID format subroutine generates a suffix code and a prefix code, as necessary, from the accessed SPID format table. Next, in query step 405, the prefix and suffix codes are examined. If there is no prefix and no suffix code, and AT&T protocol has been selected (the answer to the query step 401 is YES), a point-to-point connection (involving no SPID) is inferred, and the process transitions to step 406, which generates a "NO SPIDs" indication, and exits the subroutine of FIG. 4 to the next step 304 of the routine of FIG. 3. On the other hand, if the connection is not a point-to-point connection via an AT&T switch, the answer to query step 405 will be NO, and the subroutine of FIG. 4 proceeds to determine the prefix code (PC), if applicable.

In particular, the SPID format subroutine transitions to query step 407, where the prefix code is examined to determine whether it indicates an area code. If the answer to query step 407 is YES, the subroutine transitions to step 408, which sets the three digit area code to the first three digits of the LDN (entered by the user) as the SPID prefix, and proceeds to step 412, wherein the SPID suffix code is derived. On the other hand, if the answer to query step 407 is NO (indicating no three digit prefix code), the subroutine transitions to step 409, wherein the prefix code is examined to determine whether it is the two digit prefix code '01'.

If the answer to query step 409 is YES, the subroutine transitions to step 410, which sets the two digit code '01' as the SPID prefix, and proceeds to step 412. If the answer to query step 409 is NO, however, the SPID format subroutine transitions to step 411, which indicates that no prefix is to be employed, and the subroutine proceeds to the suffix code generation step 412. In step 412, a zero to four digit suffix code is generated from whichever SPID format table was selected in SPID format table selection steps 402 or 403, described above.

Once the SPID's suffix code has been generated, the SPID format subroutine transitions to step 413, wherein a first SPID is generated. This first SPID is defined as the combination of the prefix code (as determined in one of the above step 408 or step 410), the last seven digits of the local directory number (LDN) entered by the user in step 301, and the suffix code generated in step 412.

Once this first SPID has been generated, the subroutine transitions to query step 414, which examines the phone number information entered by the user, to determine whether the user had entered more than one phone number. If the answer to query step 414 is NO (the terminal equipment has only one phone number), the subroutine transitions to step 415, which formats the second (non-existent phone number-associated) SPID as 'none', and exits to step 304 of the main routine of FIG. 3.

On the other hand, if the answer to query step 414 is YES (the terminal equipment contains more than one (two) phone number entries), the SPID format subroutine transitions to step 415, which formats the second SPID as the combination of the prefix code generated in either step 408 or step 410), the second LDN entered by the user in step 301, and the suffix code generated in step 412. (It may be noted that the DMS SPID formats include exceptions for the second LDN, which is not equal to the suffix for the first LDN, as shown in FIG. 7. Also, in table of FIG. 7, the area code is considered to be the first three digits, and the LDN is considered to be the last seven digits.) Once the second SPID has been generated, the subroutine of FIG. 4 exits to step 304 of the main routine of FIG. 3.

With a single SPID or two SPIDs having been determined in accordance with execution of the SPID format sub-routine of FIG. 4, described above, then in step 304 of the main routine of FIG. 3, an attempt is made to bring up the line (registering the SPID(s)). If the attempt is successful, it is inferred that the derived SPID(s) and associated switch protocol (as determined in the SPID format subroutine of FIG. 4) are correct, and the process transitions to step 310—the first step in a test call sequence, to be described. On the other hand, if the attempt to bring up the line using the derived SPID(s) is unsuccessful, the process transitions to a sequence of operations, to be described, to determine the reason for the failure.

More particularly, during the initial attempt to select and register the proper National ISDN SPID format, the routine checks for characteristic behavior of AT&T switches, namely, the receipt of any Management Information Message (MIM), or receipt of a call set-up message containing an invalid reference number, as shown in query step 305. Since such responses are unique to AT&T switches, if the answer to query step 305 is YES, it is inferred that the switch is an AT&T switch and the process transitions to step 306. In step 306, the routine selects AT&T custom protocol and resets the SPID format index to zero. It then transitions to a SPID table-based exhaustive search subroutine to be described, that begins with query step 307. On the other hand, if no such 'AT&T' responses have been received, it is inferred that the switch is not an AT&T switch and the process transitions to query step 307 without changing the initially selected National ISDN SPID format index.

In query step 307, the currently accessed table of SPID format indices is stepped or advanced, one index entry at a time, to the next SPID index and, at each iteration, an inquiry is made as to whether the end of the table has been reached—namely, have all of the table SPID format entries been tried? If the answer to query step 307 is YES, indicating none of the entries has produced the required SPID, a failure to generate a SPID is inferred, and the routine is terminated (STOP=Failure).

Where the split area code AUTOSPID detection routine described in the above-referenced '533 application is employed, the routine inquires whether the currently employed area code entry, as supplied by the user, is located in a 'split' area code table. As described in that application, in one non-limiting implementation, the split area code table may contain a list of dual entries. Each entry comprises a current or new area code, and a previous area code from which the new area code was subdivided or split. In an alternative implementation of the split area code table, each area code entry may have an associated 'split' bit, the value of which indicates whether that area code listing derives, or has been split, from a previous area code. If the area code entry is such a split area code, the table also contains a pointer to the previous area code from which the split area code was derived.

If the current area code is found in the split area code table, then the area code that has been used to generate a respective SPID is changed to the other (old) area code (as pointed to by that listing in the split area code table), and the SPID generation routine loops back to step 302, using the same parameter data provided in step 301, except for the replacement area code derived from the split area code table. However, if the current area code is not found in the split area code table, a failure to generate a SPID is inferred and the routine is terminated (STOP=Failure).

If the answer to query step 307 is NO—indicating that, for the currently employed area code (old or new), additional SPID format table entries remain—the routine transitions to step 308. In step 308, respective prefix and suffix codes are derived using the next index entry in the table, and either one or two SPIDs are generated, as determined by the number of LDNs entered by the user, in accordance with the subroutine of FIG. 4.

With one or two new SPIDs generated from the next table entry, the routine advances to step 309, and attempts to bring up the line (register the generated SPID(s)). If the attempt to bring up the line is successful, it is inferred that the derived SPID and its associated switch protocol as determined in the subroutine of FIG. 4 are correct, and the process transitions to step 310. However, if the attempt to bring up the line using the derived SPID(s) is unsuccessful, the process loops back to the table entry search subroutine at step 307. Eventually, for the current area code, either the last entry in the SPID format table will be processed without bringing up the line, resulting in step 307 branching to split area code query step 317, or the line will be successfully brought up in step 309, and the process will transition to test call attempt step 310.

Once the line has been successfully brought up, via one of steps 304 and 309, and the routine transitions to test call attempt step 310, the auto-spid routine branches into the test call subroutine shown in FIG. 5. In the first (query) step 501 of the test call attempt subroutine, the number of phone numbers entered by the user is determined. If only one LDN has been entered (the answer to query step 501 is NO), the subroutine transitions to step 502, which sets the number to be dialed in the test call as that one number entered by the user. The subroutine then transitions to step 504. On the other hand if two phone numbers have been entered (the answer to query step 501 is YES), the subroutine transitions to step 503, which uses the first entered number as the 'calling' number and sets the 'to be dialed' or 'called' number in the test call as the second number entered by the user. The call attempt subroutine then transitions to step 504.

In step 504, the terminal equipment places a test call to the number selected in the appropriate one of steps 502 and 503. (To help distinguish between National ISDN and DMS-100 switch protocols, the test call contains a low layer compatibility information element, which is specified under National ISDN, but not under DMS custom. As will be described, the routine monitors test call progress for receipt of a prescribed status message associated with the behavior of DMS Custom switch protocol.)

Next, in step 505, the subroutine looks to see whether it has received a failure indication from the switch or whether the placed call has not been received from the switch within a prescribed period of time (e.g., within 30 seconds, as a non-limiting example). If the answer to query step 505 is YES (a call has been successfully placed), it is inferred that the determined SPID/switch protocol is correct, and the subroutine exits to step 311 of the routine of FIG. 3. However, if the answer to query step 505 is NO (the attempt to place a test call has not been successful), the test call subroutine transitions to step 506, which augments the called number by adding a prefix "9" to the LDN, and the call is redialed in step 507.

In step 508, the subroutine looks to see whether it has received a failure indication from the switch or whether the placed call has not been received within the prescribed period of time. If the answer to query step 508 is YES (the redialed call has been successful), it is inferred that the determined SPID/switch protocol is correct, and the subroutine exits to step 311 of the routine of FIG. 3. However, if the answer to query step 508 is NO (the redialed call has not been successful), the test call fails and the process exits to step 307 described previously.

If the test call (or redialed test call) has been successfully placed in either of steps 505 or 508, with the call attempt subroutine having branched to query step 311 in the main routine of FIG. 3, a determination is made as to whether the selected protocol is that of an AT&T custom switch. If the answer to step 311 is YES, the process is terminated at 'ready to place a call' step 320. The switch has been identified as an AT&T switch and the terminal equipment is now ready to place a call.

If the answer to step 311 is NO, the process transitions to query step 312, which inquires whether the test call returned a status message containing the Cause IE equal to 43 (ACCESS INFO DISCARDED), which is characteristic of DMS custom switch protocol. As pointed out above, the test call contains a low layer compatibility information element, specified under National ISDN, but not under DMS custom, so that the test call progress can be monitored for a prescribed status message associated with the behavior of DMS Custom switch protocol.

If the iterative SPID search has advanced beyond the last National ISDN entry, DMS behavior is inferred. If DMS behavior is not detected, it is concluded that the SPID is associated with National ISDN switch protocol. Thus, if the answer to query step 312 is YES, DMS custom protocol is selected in step 313, and the process is successfully terminated at 'ready to place a call' step 320. However, if the answer to query step 312 is NO, it is inferred that the SPID is associated with National ISDN switch protocol, and the routine is successfully terminated at step 320.

As pointed out briefly above, it would be desirable to improve the reliability of and thereby enhance the AUTOSPID detection scheme the '241 patent, and to also provide a mechanism that is able to determine both the type and the communication protocol of the switch to which the customer's ISDN terminal adapter is coupled, irrespective of the terminal adapter's ability to generate a SPID. Through an investigation and analysis of attributes and behavior of the various telecommunication switches employed by telecommunication service providers, we have arrived at a prescribed interrogation message, shown in FIG. 8, the content of which is insufficient to be recognized as a fully valid message, yet is sufficient to evoke a reply from the switch, which uniquely identifies both the type and the protocol being used by the switch being interrogated, regardless of switch type.

Namely, when transmitted to the switch, in accordance with the communication control software employed by the terminal equipment's supervisory communication controller, the interrogation message stimulates the switch to return a reply or response message. The contents of the reply message are then analyzed to derive both the type and communication protocol of the switch. Once determined, this switch type and protocol information may be used by the automated service profile identifier (SPID) detection mechanism of the above-referenced '241 patent, described above with reference to FIGS. 2–7, to facilitate SPID generation, as will be described in detail below with reference to FIG. 17.

As shown in FIG. 8, the switch-interrogation message employed in the present invention includes a standard six byte header portion 81, which conforms with conventional switch communication protocol. As a non-limiting example, code value assignments may be those associated with the operation of a Nortel DMS-100 switch, and described in paragraphs 4.6.10–4.6.10.8, pages D-94.1–D-94.9 of an ISDN Basic Rate Access Interface Specification, entitled "Functional Call Control Signaling," Northern Telecom (NIS S208-4, Issue 1.1) Sep. 1989.

As those skilled in the art are aware, the contents of the header are not always the same and can be expected to differ among successive communication initialization sequences, even for the same switch type. The first octet 81-1 indicates the direction of transmission. The illustrated value of 00 corresponds to transmission from the user (terminal adapter) to the network (switch). A value of 02 (the first byte in the reply message) corresponds to a transmission from the network to the user. The second octet 81-2, shown as f5, is a terminal endpoint identifier (TEI), which is assigned by the switch. The third octet 81-3 (00) is the Q.921 control field. The remaining octets 81-4–81-6 depend upon the value of the Q.921 control field 81-3.

Immediately following the six byte header 81 is the byte 82, having the value 7b (hex), as a non-limiting example, an information message type 83, which includes a first byte 83-1 having the value 1c, a facility information element, which is followed by a second byte 83-2 (0c) representative of the length of the facility information element. The second byte 83-2 is followed by a service discriminator byte 83-3, which is followed by the components of the facility information element, comprised of a payload sequence 83-4 of arbitrary bytes (e.g., here 30, 31 repeated).

There are four types of components that would normally be inserted in the location of the payload sequence 83-4. These component types are A1 (invoke), A2 (return result), A3 (return error), and A4 (reject). Each of these four component types has a set of associated mandatory and optional values, examples of which are set forth in the above-cited Northern Telecom Specification. Also, normally employed (valid) values for the service discriminator byte 83-3 are F1 (for supplementary services) and F2 (for management *services). However, in order to prevent the switch from understanding the interrogation message of FIG. 8, the value 31 in the location of the service discriminator 83-3 is invalid (it is neither of the valid values F1 and F2), and the payload sequence 83-4 (30, 31, 30, . . . ) is also invalid.

Conventional communication initialization exchange sequences for the various switch types tabulated in FIG. 9 are illustrated in detail in FIGS. 10–15, respectively. In FIGS. 10–15, each of the interrogation message of FIG. 8 and the respective switch response messages tabulated in FIG. 9 are underlined. As can be seen from FIG. 9, and as shown in the underlined received (RX) messages of the channel traces of FIGS. 10–15, no two responses, in terms of both message content and information element content, from the various switch types, are the same. As a consequence, it is possible to uniquely identify the switch protocol (which necessarily implies switch type) of the switch being interrogated.

Figure 16:
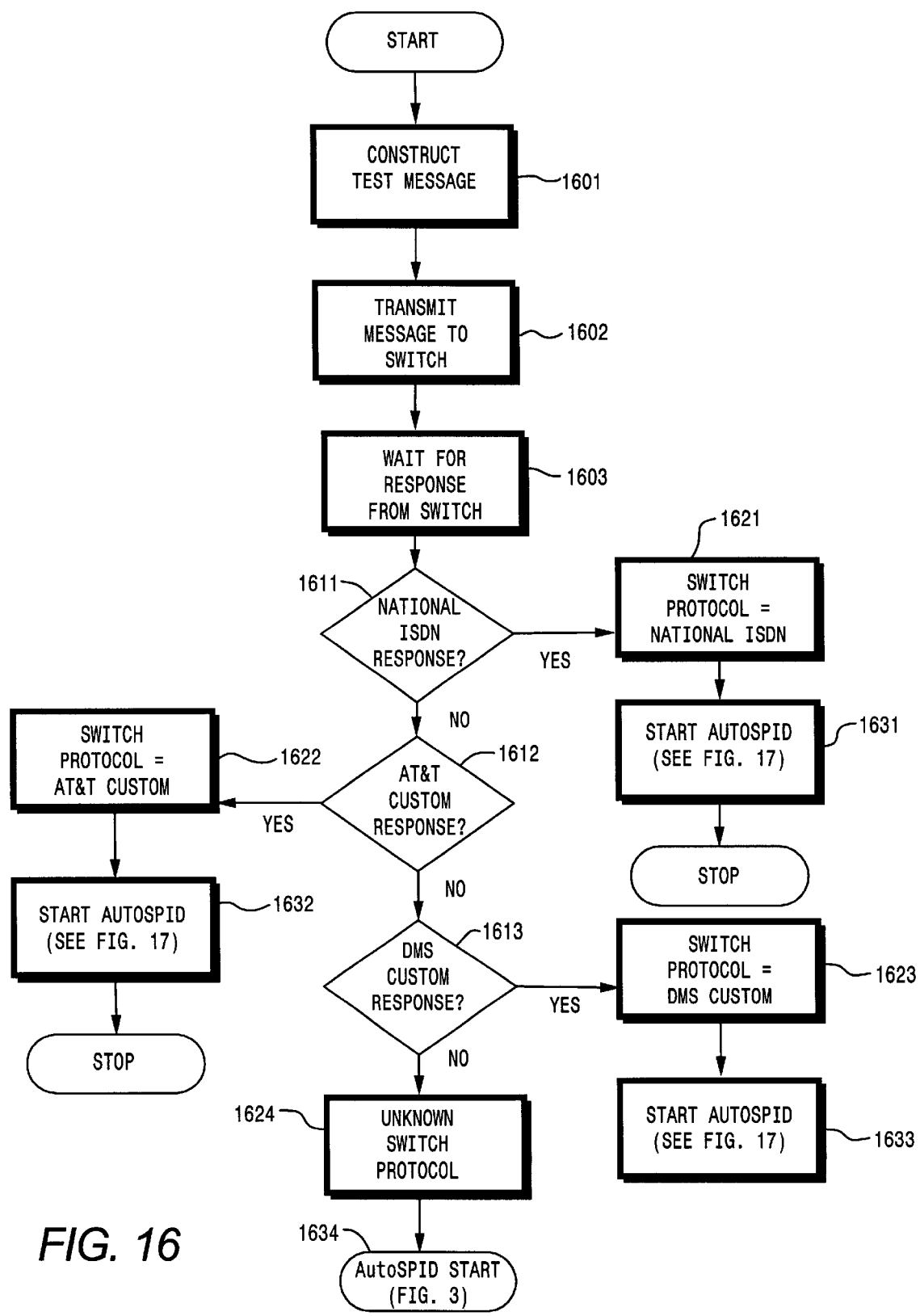
FIG. 16 shows respective steps of an automatic switch type and communication protocol detection mechanism in accordance with the present invention, together with its integration with a modification of the AUTOSPID detection mechanism of FIG. 3, diagrammatically illustrated in FIGS. 17–19.

Referring now to the switch type/protocol detection routine of FIG. 16, at a first step 1601, an interrogation message having a standard header 81, followed by the respective switch response-stimulating components 82–84 shown in FIG. 8, described above, is assembled or constructed. Once the terminal adapter has assembled this interrogation message it transmits the message to the switch in step 1602, and waits for a reply message in step 1603. For the respective switch types and associated protocols described above and listed in FIG. 9, the contents of the switch response message can be expected to correspond to one of those tabulated in the message and information components of FIG. 9 and itemized in FIGS. 10–15.

Thus, a comparison of the contents of the response message from the switch with the various tabulated response messages will allow the switch protocol to be identified. Once a reply message from the interrogated switch is received, the process proceeds to sequence through respective query steps 1611–1613, to identify the switch protocol and switch type. It may be noted that the order in which the switch response messages are compared with the expected response messages (listed in FIG. 9) may vary from that given in FIG. 16.

Figure 18:
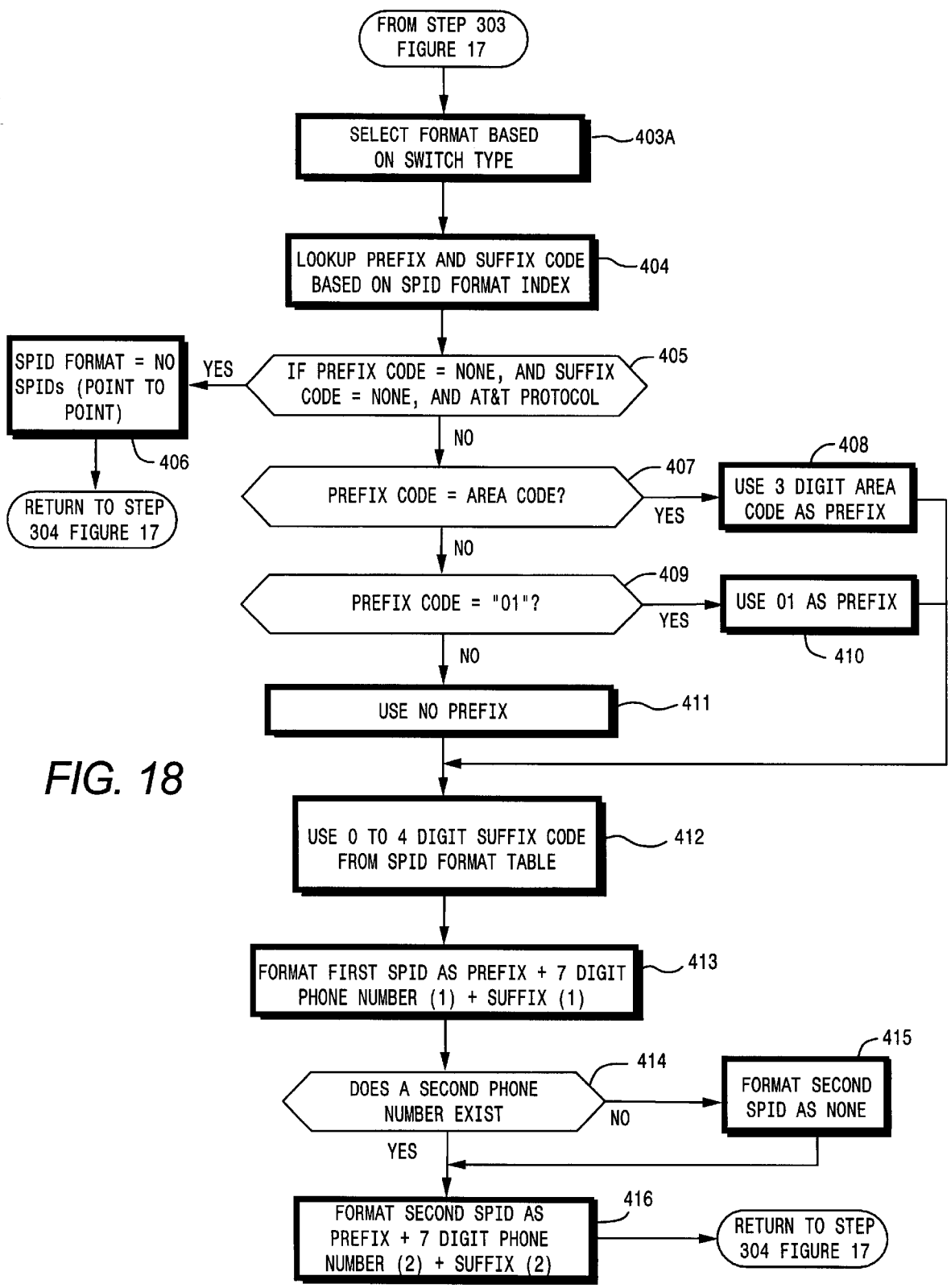
Figure 19:
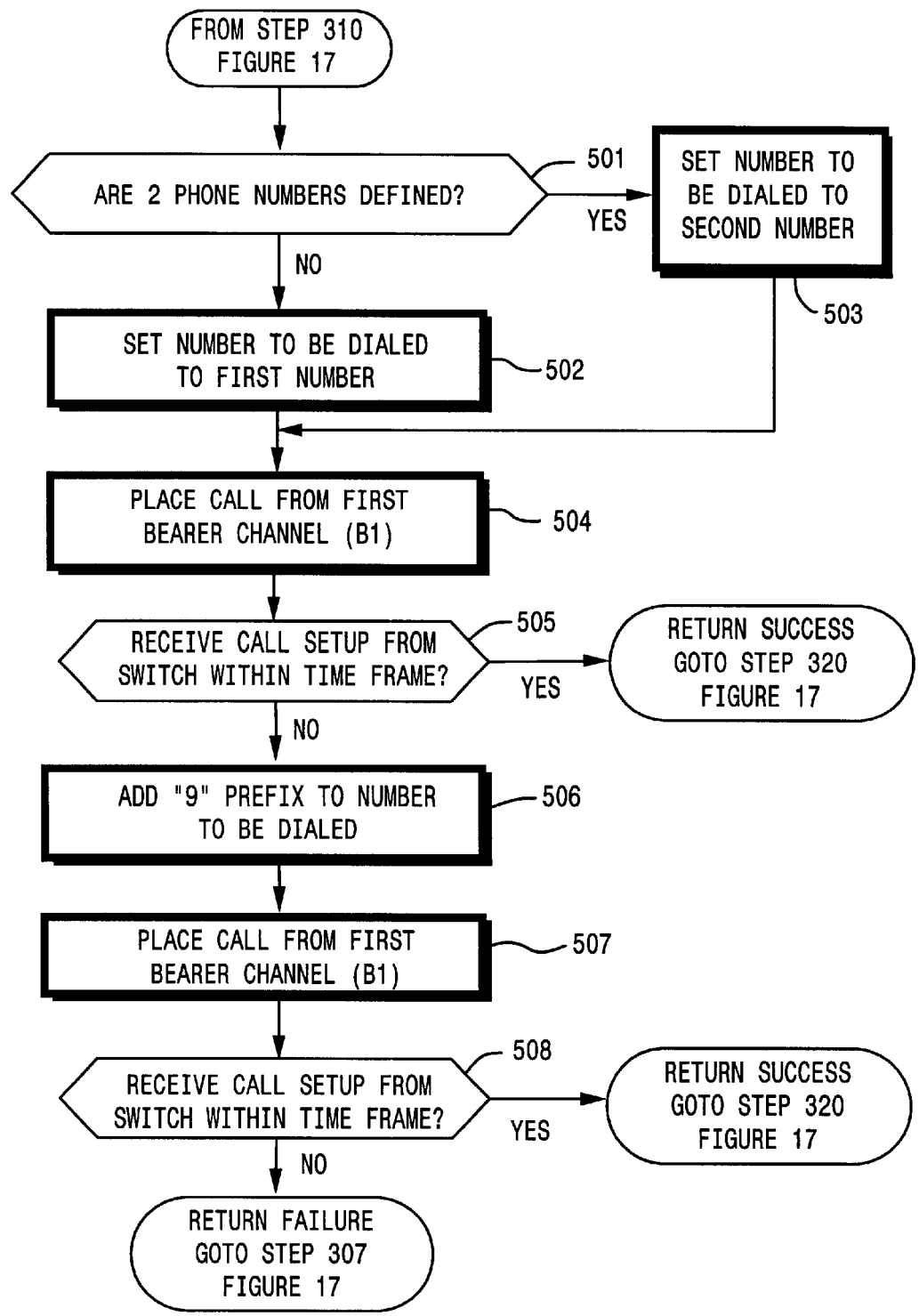

For the illustrated example, in query step 1611, the contents of the received response message are compared with the expected response message contents tabulated in FIG. 9, associated with National ISDN protocol and the particular switch type (one of AT&T 5ESS, Nortel DMS-100 and Siemens EWSD) whose control software is being employed. If the answer to query step 1611 is YES, the switch protocol is so identified in step 1621. Given the switch protocol, in step 1631 the process may next branch to the modified AUTOSPID sequence of FIGS. 17–19, which is run to completion.

Figure 17:
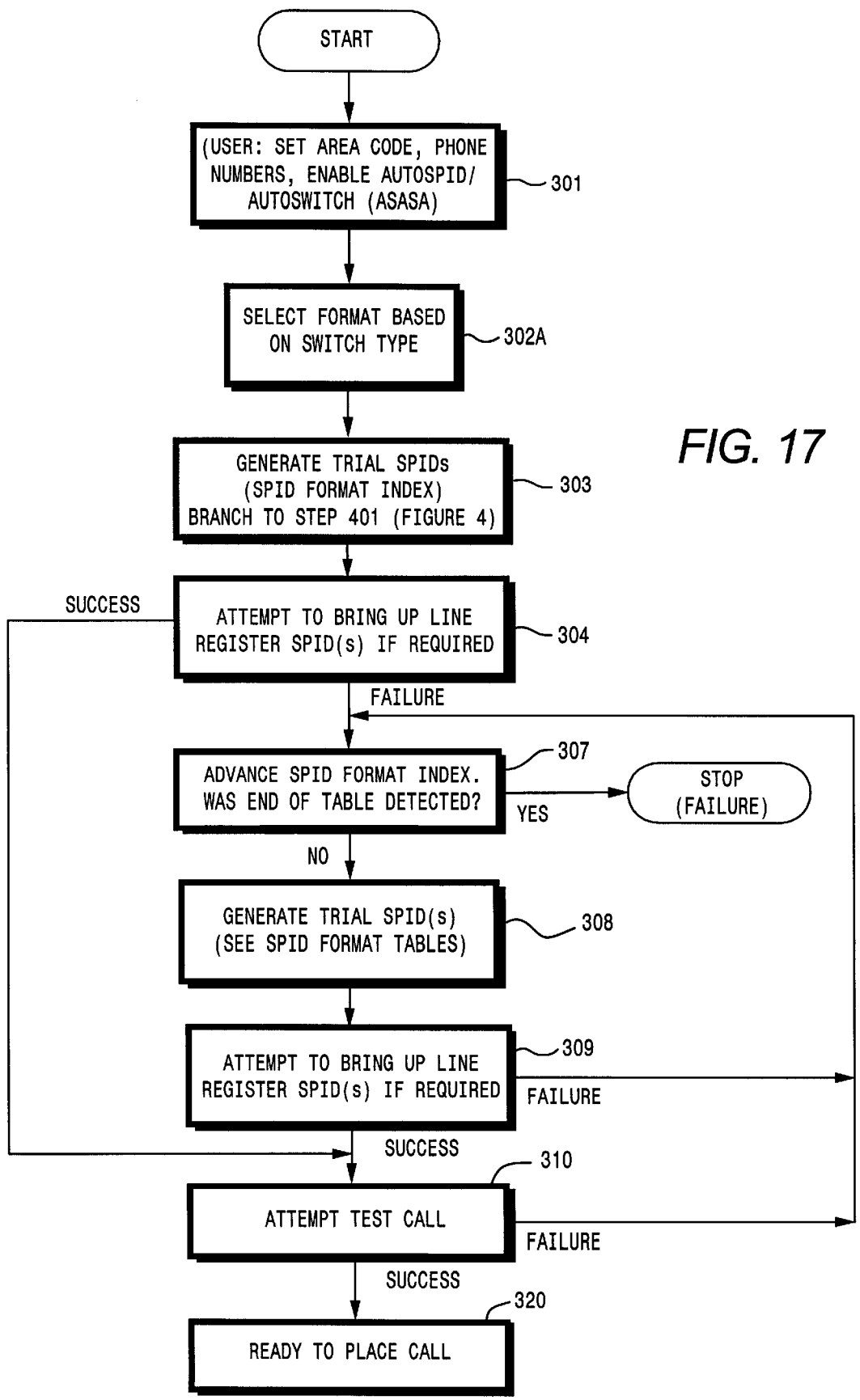
FIGS. 17–19 show modifications to the AUTOSPID mechanism flow charts of FIGS. 3–5 to incorporate the automatic switch type and communication protocol detection mechanism of the present invention.

As can be seen from a comparison of the modified flow sequence of FIG. 17 with that of FIG. 3, step 302A of FIG. 17 replaces step 302 of FIG. 3, and selects the format based upon the detected switch type, since switch type has been already been determined. In addition, steps 305, 306, 311, 312 and 313 are not performed. Similarly, in the modified flow sequence of FIG. 18, step 401 is not performed and step 403A, which selects the format based upon the detected switch type, replaces step 403. Also, steps 406 and 416 provide a return to step 304 in FIG. 17. In the modified flow sequence of FIG. 19, steps 502 and 508 provide a return to step 320 of FIG. 17.

If the answer to query step 1611 is NO, the routine compares the response with those associated with AT&T Custom protocol in step 1612. In query step 1612, the received response message is compared with the expected response associated with each of AT&T multipoint (MP) and point-to-point (PP) protocols. If the answer to query step 1612 is YES, the switch protocol is so identified in step 1622, and in step 1632 the routine may branch to the modified AUTOSPID routine of FIGS. 17–19, which is then run to completion.

If the answer to query step 1612 is NO, however, the routine proceeds to compare the contents of the response message with those associated with DMS Custom protocol in step 1613, as tabulated in FIG. 9. If the answer to query step 1613 is YES, the switch protocol is identified as DMS Custom in step 1623 and, in step 1633, the routine may branch to the modified AUTOSPID routine of FIGS. 17–19, which is then run to completion. If the answer to query step 1613 is NO, however, then it is inferred that the switch protocol is none of those listed in the table of FIG. 9, and the routine transitions to step 1624 indicating that the switch protocol is unknown, and in step 1634 the routine branches to step 301 of the link pre-establishment routine of FIG. 3.

As will be appreciated from the foregoing description, the automated telecommunication switch type and protocol detection routine of the present invention is operative to improve upon the reliability of the AUTOSPID detection scheme described in the '241 patent, by determining, independently of SPID generation, both the type and communication protocol of the telecommunication switch to which the customer's ISDN terminal adapter is coupled. The content of the switch-interrogation message is insufficient to be recognized by the switch as a fully valid message, yet is sufficient to evoke a reply from the switch, which uniquely identifies the both the type and the protocol being used by the switch, regardless of switch type.

In addition to a standard header of conventional switch communication protocol, the byte 7b (hex), an information message type, which includes the byte 1c (hex), a facility information element, and a second byte representative of the length of the facility information element, an invalid service discriminator byte that is operative to prevent said switch from understanding said test message, and a component payload sequence of invalid bytes. In order to prevent the switch from understanding the interrogation message, the value of the service discriminator is invalid; also, the payload component of the facility information element is an invalid sequence.

Once a reply message from the interrogated switch is received, the process proceeds to sequence through respective query steps, associated with the respectively different switches and protocols of the table, to identify the switch protocol and switch type. The switch type and protocol information may be coupled with an automated service profile identifier (SPID) detection mechanism to facilitate generation of the requisite SPID(s).

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. A method for enabling a digital communications device to place a call via telecommunications equipment, using equipment type and associated communications protocol information that is required for conducting digital communications via said telecommunications equipment, comprising the steps of:

(a) coupling, with said digital communications device, an automated telecommunications equipment type and associated communications protocol detection routine which, when executed, is operative to determine the type of said telecommunications equipment and said associated communications protocol used by said telecommunications equipment, in order for said digital communications device to conduct digital communications via said telecommunications equipment, said routine comprising the steps of:

(a1) generating a test message which, when received by said telecommunications equipment, is operative to cause said telecommunications equipment to transmit a response message containing information associated with said type of said telecommunications equipment and said associated communications protocol used by said telecommunications equipment, (a2) transmitting said test message generated in step (a1) to said telecommunications equipment, (a3) receiving said response message transmitted by said telecommunications equipment in step (a2), and (a4) determining, from said response message received from said telecommunications equipment in step (a3), said type of said telecommunications equipment and said associated communications protocol used by said telecommunications equipment; and (b) executing the automated routine of step (a), so as to identify said type of said telecommunications equipment and said associated communications protocol used by said telecommunications equipment.

2. A method according to claim 1, wherein said test message includes a facility information element associated with a prescribed telecommunication equipment's communication protocol.

3. A method according to claim 2, wherein said test message further includes an element representative of the length of said facility information element associated with said prescribed telecommunication equipment's communication protocol.

4. A method according to claim 3, wherein said test message further includes a prescribed code sequence following said element and representative of the length of said facility information element associated with said prescribed telecommunication equipment's communication protocol.

5. A method according to claim 2, wherein said facility information element is associated with DMS Custom switch protocol.

6. A method according to claim 1, further including the step (c) of registering a service profile identifier in accordance said type of said telecommunications equipment and said associated communications protocol used by said telecommunications equipment, as identified in step (b).

7. A method according to claim 1, further including the step (d) of, in response to registration of said SPID in step (c), placing a test call via said telecommunications equipment to a local directory number and, in response to successful placement of said test call, configuring said digital communications device for the placement of calls using said registered SPID.

8. A method according to claim 1, wherein said associated communications protocol is DMS-100 protocol.

9. A method according to claim 1, wherein said associated communications protocol is National ISDN protocol.

10. A method according to claim 1, wherein said associated communications protocol is AT&T custom protocol.

11. A method according to claim 1, wherein said test message comprises a header, followed by a prescribed byte, an information message type, that includes includes a first byte, a facility information element, which is followed by a second byte representative of the length of the facility information element, and a third, service discriminator byte, followed by a payload sequence of arbitrary bytes.

12. A method according to claim 11, wherein said prescribed byte is the byte 7b (hex).

13. A method according to claim 12, wherein said first byte is the byte 1c (hex).

14. A method according to claim 13, wherein said service discriminator byte has a value that is operative to prevent said telecommunication equipment switch from understanding said test message.

15. A method according to claim 1, wherein said test message comprises a sequence of a header portion which conforms with switch communication protocol, a byte having the value 7b (hex), an information message type, that includes a first byte having the value 1c (hex), a facility information element, and a second byte representative of the length of the facility contents, an invalid service discriminator byte that is operative to prevent said telecommunication equipment switch from understanding said test message, and a component payload sequence of invalid bytes.

16. In an arrangement for enabling data terminal equipment to conduct digital communications via a central office switch over a telecommunications network to a destination site, including ISDN terminal equipment which is configured to interface said data terminal equipment over a link to said central office switch, said ISDN terminal equipment having a user interface through which directory number and area code information is supplied, and a communications controller, which is operative to control communications carried out by said ISDN terminal equipment, the improvement wherein said communications controller is operative to automatically to determine the type of said central office switch and associated communication protocol used by said switch, and required by said data terminal equipment to conduct digital communications via said central office switch.

17. The improvement according to claim 16, wherein communications controller is further operative to automatically generate a service profile identifier (SPID) required for conducting digital communications via said central office switch, and bring up said link to said central office switch using the generated SPID.

18. The improvement according to claim 16, wherein said communications controller is operative to transmit a test message to said switch, said test message being operative to cause said switch to transmit a response message containing information associated with said type of said switch and said associated communication protocol used by said switch.

19. The improvement according to claim 18, wherein said test message includes a facility information element associated with a prescribed switch communication protocol.

20. The improvement according to claim 19, wherein said test message further includes an element representative of the length of said facility information element.

21. The improvement according to claim 20, wherein said test message further includes a prescribed code sequence following said element representative of the length of said facility information element.

22. The improvement according to claim 19, wherein said facility information element is associated with DMS Custom switch protocol.

23. The improvement according to claim 17, wherein said communications controller is operative, in response to registration of said SPID, to place a test call to a local directory number and, in response to successful placement of said test call, to configure said digital communications device for the placement of calls using said registered SPID.

24. The improvement according to claim 16, wherein said associated communications protocol is DMS-100 protocol.

25. The improvement according to claim 16, wherein said associated communications protocol is National ISDN protocol.

26. The improvement according to claim 16, wherein said associated communications protocol is AT&T custom protocol.

27. The improvement according to claim 16, wherein said test message comprises a header, followed by a prescribed byte, an information message type, said information message type including a first byte, representative of a facility information element, followed by a second byte representative of the length of the facility information element, and a third, service discriminator byte, followed by a payload sequence of arbitrary bytes.

28. The improvement according to claim 27, wherein said prescribed byte is the byte 7b (hex).

29. The improvement according to claim 28, wherein said first byte is the byte 1c (hex).

30. The improvement according to claim 29, wherein said service discriminator byte has a value that is operative to prevent said switch from understanding said test message.

31. The improvement according to claim 16, wherein said test message comprises a sequence of a header portion which conforms with switch communication protocol, a byte having the value 7b (hex), an information message type, that includes a first byte having the value 1c (hex), a facility information element, a second byte representative of the length of the facility information element, an invalid service discriminator byte that is operative to prevent said switch from understanding said test message, and a component payload sequence of invalid bytes.

32. An arrangement for enabling data terminal equipment to conduct digital communications via a central office switch over a telecommunications network to a destination site, including ISDN terminal equipment which is configured to interface said data terminal equipment over a local loop to said central office switch, said ISDN terminal equipment having a user interface through which directory number information is supplied by a user, and a communications controller, which is operative to control communications carried out by said ISDN terminal equipment, and which is programmed to format a service profile identifier required for conducting digital communications via said central office switch, in accordance with a service profile identifier detection routine which, when executed, automatically performs the following steps:

(a) generating a test message which, when received by said central office switch, is operative to cause said switch to transmit a response message containing information associated with said type of said switch and said associated communications protocol used by said switch;

(b) transmitting said test message generated in step (a) to said switch;

(c) receiving said response message transmitted by said switch in step (c);

(d) determining, from said response message received from said switch in step (c), said type of said switch and said associated communications protocol used by said switch; and (e) registering a service profile identifier in accordance said type of said switch and said associated communications protocol used by said switch, as determined in step (d).

33. An arrangement according to claim 32, further including the step (f) of, in response to registration of said SPID in step (e), placing a test call via said switch to a local directory number and, in response to successful placement of said test call, configuring said digital communications device for the placement of calls using said registered SPID.

34. An arrangement according to claim 32, wherein said test message comprises a sequence of a header portion which conforms with switch communication protocol, a byte having the value 7b (hex), an information message type, that includes a first byte having the value 1c (hex), an information facility element, a second byte representative of the length of the facility information element, an invalid service discriminator byte that is operative to prevent said switch from understanding said test message, and a component payload sequence of invalid bytes.

\* \* \* \* \*

UNITED STATES PATENT AND TRADEMARK OFFICE
CERTIFICATE OF CORRECTION

PATENT NO. : 6,246,671 B1
DATED : June 12, 2001
INVENTOR(S) : Michael T. Lattanzi, James M. Glass, III, Paul G. McElroy, Charles R. Rehage It is certified that error appears in the above-identified patent and that said Letters Patent is hereby corrected as shown below:

Column 1,
Line 12, delete "1533" insert -- '533 --

Column 3,
Line 6, delete "element an invalid sequence" insert -- element comprises an invalid sequence --

Column 5,
Line 8, delete "LDNS," insert -- LDNs, --

Column 12,
Line 23, delete "identifies the both the type" insert -- identifies both the type --

Column 13,
Line 41, delete "accordance said type" insert -- accordance with said type --
Line 59, delete "that includes includes" insert -- that includes --

Column 14,
Line 27, delete "automatically to determine" insert -- automatically determine --

Column 16,
Line 19, delete "in accordance" insert -- in accordance with --

Signed and Sealed this

Twenty-sixth Day of February, 2002

Attest:

*Attesting Officer*

JAMES E. ROGAN
*Director of the United States Patent and Trademark Office*